F. A. LEAS.
REGENERATIVE REVERBERATORY FURNACE.
APPLICATION FILED OCT. 5, 1908.
962,644.
Patented June 28, 1910.
2 SHEETS—SHEET 1.
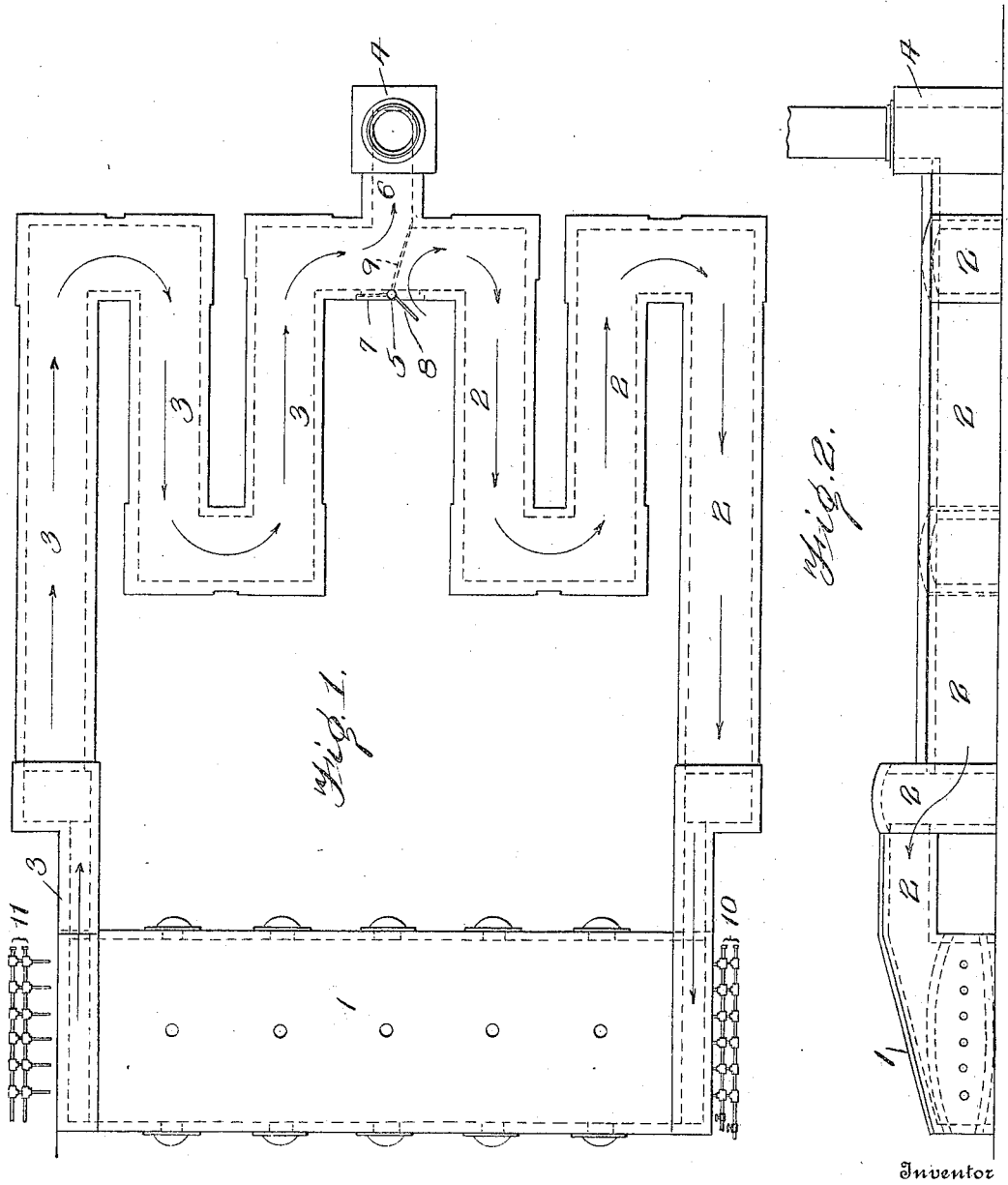
Witnesses
Inventor
F. A. Leas.
By Smith & Frazer
Attorneys.

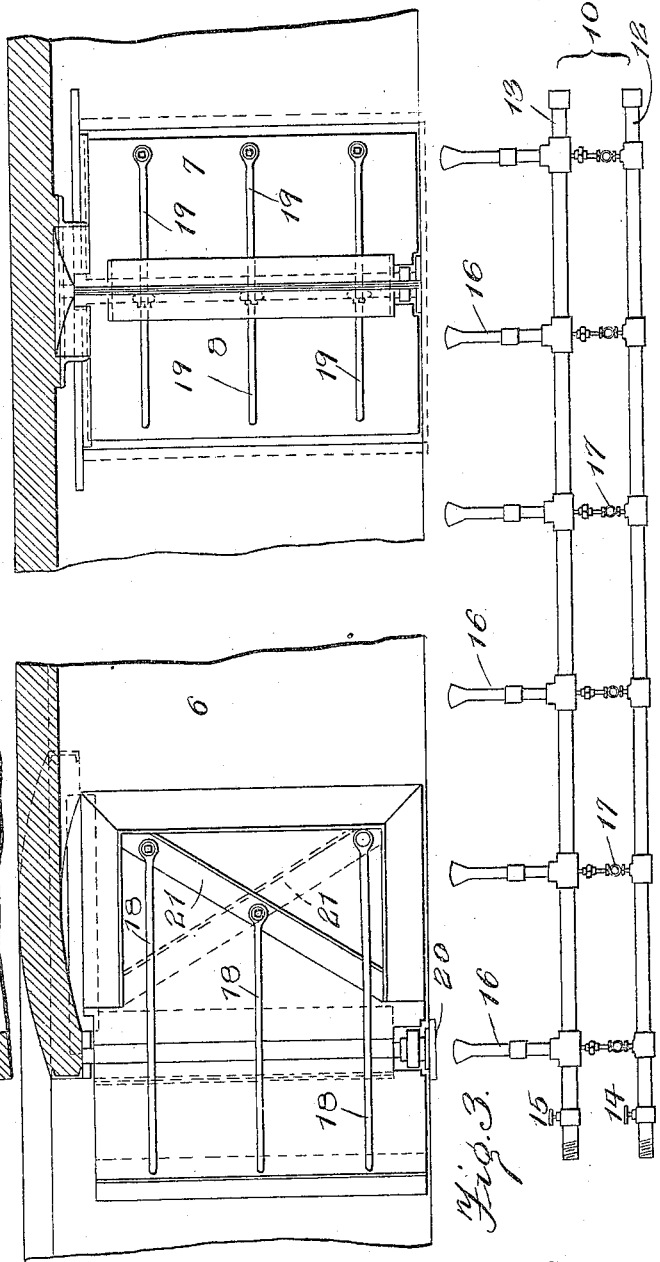

UNITED STATES PATENT OFFICE.

FREDERICK A. LEAS, OF OAKLAND, CALIFORNIA.

REGENERATIVE REVERBERATORY FURNACE.

962,644.

Specification of Letters Patent. Patented June 28, 1910.

Application filed October 5, 1908. Serial No. 456,256.

*To all whom it may concern:*

Be it known that I, FREDERICK A. LEAS, a citizen of the United States, residing in the city of Oakland, county of Alameda, State of California, have invented certain new and useful Improvements in Regenerative Reverberatory Furnaces, of which the following is a specification.

My invention relates to improvements in reversible, regenerative, reverberatory furnaces and more particularly to such furnaces adapted for use in copper smelting.

The object of my invention is to attain approximately the full economy of open hearth steel practice, in copper smelting practice, by providing a furnace for this purpose with means for efficiently preheating the air for combustion in the furnace.

It may be noted that the obvious method of attaining the result sought by me, as above indicated, would be the use of regenerative checker work chambers employed in open hearth steel practice. This method, however, has been tried and proved a failure in copper smelting, because of the large quantities of dust carried over; especially when, as is frequently the case, charging such furnaces with hot calcines. It was found that this dust quickly filled up the regenerators, rendering the same useless; besides, it was found difficult to recover the dust without tearing out the checker work. As this dust carries high values in copper, gold and silver, the loss, it will be observed, is a serious item. It has also been proposed to obviate a similar difficulty in regenerative furnaces by shunting off a portion of the products of combustion, thus preventing them from passing through the regenerators. It is manifest, however, that this would not be an economical method of operation because it involves a considerable loss of heat. It has also been proposed to preheat the air by passing the same through flues arranged adjacent to the flues and chambers containing the heated products of combustion, but this mode of operation, it is obvious, is not a truly regenerative furnace in the sense commonly understood in the art, but is similar to what are called "recuperative" flues or furnaces in gas generators, as distinguished from truly regenerative chambers in which the air to be heated and the products of combustion are intermittently or alternately passed in contact with the same surface. It is well known, of course, in the art that recuperative flues have never been as highly efficient as truly regenerative chambers because of the difficulty of transferring large quantities of heat through nonconducting walls. In common reverberatory furnace practice, regeneration is not attempted, but a long dust settling flue is used to recover the valuable dust above noted, and the values recovered have amply justified their use.

By my invention I have combined the dust saving features of the common copper reverberatory practice with the heat economy features of open hearth steel practice, in which I have eliminated the checker work regenerators, of the latter, and used in place thereof long dust settling flues, operating in a truly regenerative sense.

With the above said object in view, my invention consists in the novel construction and combination of parts, and details thereof, as hereinafter described and claimed, with reference to the accompanying drawings, in which—

Figure 1 is a plan view of a reverberatory furnace showing my invention applied thereto; Fig. 2 is a side elevation thereof; Fig. 3 is an enlarged detail view of the oil burner apparatus; Fig. 4 is a detail, in section, of the damper, with the latter in elevation; Fig. 5 is a similar view thereof in a plane at a right angle thereto; and Fig. 6 is a similar view in a plane at a right angle to Fig. 5.

Referring to the drawings, in which the same reference characters relate to the same or corresponding parts in all the views, I have shown in sufficient outline a common reverberatory furnace 1, at the opposite ends of which is mounted oil burning apparatus 10 and 11, the former being shown in action supplying the reverberatory furnace with heat, while the latter is withdrawn and out of action. This oil burning apparatus may be of any common form and provided with any suitable means, not necessary to show, for introducing and withdrawing the same into and from the appropriate end of the furnace, according as the same is to be reversed in action. This apparatus comprises essentially oil supply pipes 12 connected by a plurality of suitable unions with an air supply pipe 13, the latter provided with a valve 15, by which the supply of air to the manifold burners may be put on or off, as desired, and the former pipe 12 is provided with a valve 14 exercising a similar function for the oil supply; extending from each union is an oil burner 16, into which is directed an oil supply from the pipe 12 and governed by a separate valve 17 for each burner, the air for each burner, passing from the pipe 13, into the burner at each union and mixing with the oil, in the usual way. By this means I provide an oil burning apparatus in which the supply of oil and air to all of the burners is controlled by separate valves from the individual burners, while the air or steam and oil are regulated by the individual valves for each burner. The opposite end of the reversible reverberatory furnace 1 is connected by long dust collecting flues 2 and 3, the latter of which are adapted to discharge through a flue 6 into a common stack 4, through which common outlet the products of combustion pass away.

Located opposite the entrance to the flue 6, leading to the stack 4, is a three winged damper for controlling and reversing the flow of the air alternately to the opposite ends of the reverberatory furnace, and directing the products of combustion therefrom through the appropriate flue to the stack 4. This damper is specially arranged and constructed to prevent injurious action commonly encountered in furnace practice where the dampers are located with their bearings in the central or hottest part of flues. I mount the several wings, 7, 8 and 9, of the damper, upon a rock shaft 5, which is journaled in suitable bearings at opposite sides of an air inlet opening at each end of the flues 2 and 3, as shown in Figs. 5 and 6, one end 20 of the rock shaft 5 extending through the wall of the flue whereby the damper may be operated from the outside by any suitable means; the wings 7, 8 and 9, are secured to projecting arms on the rock shaft 5, braces 19 extending between the wings 7 and 8, the outer edges of which may be provided with L-plates 22. The wing 8, it will be observed, is arranged to control the passage of air from the atmosphere into the flue 2 and right hand end of the furnace 1, while the wing 7 of the damper performs a similar function in the flue 3, and the left hand end of the said furnace. The wing 9 of said damper is adapted to close the flue 6 leading to the stack 4 against the passage of products of combustion through the flue 2 when the latter is open to the atmosphere, and to open the passage from the flue 3 to said stack when the products of combustion from the furnace are passing therethrough, and vice versa, thus reversing the action of the furnace. The wing 9 of the damper is preferably braced from opposite sides by rods 18 connecting through angle plates 21 extending diagonally across the opposite sides of said plate 9.

In the position shown in Fig. 1, the reversible furnace 1 is being fired by the manifold burner 10, the products of combustion from said furnace passing through the flue 3 to the flue 6, where they are directed by the wing 9 of the damper, through said flue 6, to the stack 4. At the same time air is drawn through the opening controlled by the wing 8 into and through the flue 2, and, thence, introduced into the furnace 1, the products of combustion passing through the flue 3 depositing their dust therein and at the same time heating the walls of the flue. Now, when this damper is reversed the wing 8 closes its opening, while the wing 7 opens its passage to the flue 3, and the wing 9 opens a passage to the flue 6 from flue 2. In this connection, it will be observed, the flue 3 will act as a preheating flue for the air passing to the reverberatory furnace, and similarly the flue 2 will so act when the operation is reversed. It should be noted that these flues are large enough to permit not only ready access thereto, through suitable openings, for removal of said dust, but to allow dust to accumulate in the flues without seriously reducing the available cross-section thereof, and, hence, it is only necessary to withdraw the dust at convenient intervals.

The flues 2 and 3, it will be noted, are arranged in compact, zig-zag form, in order to take up as little space as possible, but they may, if desired, be arranged otherwise without departing from the spirit and scope of the invention, as the essential requirement is to provide sufficient length and capacity to secure the proper preheating action upon the air and provide for the settling and accumulation of the dust to be recovered.

I claim as my invention:

1. The combination with a reversible reverberatory copper or like furnace, of two dust settling regenerative flues directly connected to opposite ends of said furnace, a damper between said flues arranged to direct the products of combustion passing through one flue after they have traversed the same and heated the walls thereof to an outlet, and to direct air through the other flue for preheating on its way to the furnace, whereby the dust from the furnace is deposited by the products of combustion in one flue, while the air is being preheated by the other, substantially as described.

2. The combination with a reversible furnace, having two regenerative flues communicating with a common outlet and with the atmosphere, of a three winged damper for reversing the action of the furnace having its bearings located outside of the central heat of the flues, one wing of said damper controlling the exit from each of said flues to the common outlet, and the other two wings thereof each controlling the inlet of air from the atmosphere to one of said flues, substantially as described.

3. The combination with a reversible furnace having two regenerative flues communicating with a common outlet and with the atmosphere, of a damper comprising three wings, a rock shaft to which said wings are secured having its bearings in the walls of the flue opposite the common outlet at points farthest removed from the central heat of the flues, one wing of said damper controlling the exit from each of said flues to the common outlet, and the other two wings thereof each controlling the inlet of air from the atmosphere to one of said flues, substantially as described.

In testimony whereof, I have signed my name to this specification, in the presence of two subscribing witnesses.

FREDERICK A. LEAS.

Witnesses:
J. B. SPERRY,
JOSEPH VAN DYNE.